(12) United States Patent
Tian

(10) Patent No.: US 12,185,381 B2
(45) Date of Patent: Dec. 31, 2024

(54) METHOD FOR DETERMINING RANDOM ACCESS RESOURCE AND NETWORK DEVICE

(71) Applicant: GUANGDONG OPPO MOBILE TELECOMMUNICATIONS CORP., LTD., Guangdong (CN)

(72) Inventor: Wenqiang Tian, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 380 days.

(21) Appl. No.: 17/835,888

(22) Filed: Jun. 8, 2022

(65) Prior Publication Data
US 2022/0304072 A1  Sep. 22, 2022

Related U.S. Application Data

(63) Continuation of application No. PCT/CN2020/127794, filed on Nov. 10, 2020.

(30) Foreign Application Priority Data

Dec. 9, 2019 (CN) .......................... 201911252878.3

(51) Int. Cl.
    *H04W 74/0833* (2024.01)
(52) U.S. Cl.
    CPC ............................. *H04W 74/0833* (2013.01)
(58) Field of Classification Search
    CPC ... H04W 16/14; H04W 60/00; H04W 60/005; H04W 68/02; H04W 76/16; H04W 88/06;
    (Continued)

(56) References Cited

U.S. PATENT DOCUMENTS 10,652,856 B2 * 5/2020 Åström ................ H04B 7/0617
11,234,154 B2 * 1/2022 Yang ................. H04W 36/0061
(Continued)

FOREIGN PATENT DOCUMENTS

CN      108513361 A      9/2018
CN      109729580 A      5/2019
(Continued)

OTHER PUBLICATIONS

First Office Action of the corresponding European application No. 20899654.6, issued on Dec. 7, 2023.
(Continued)

*Primary Examiner* — Nathan S Taylor
(74) *Attorney, Agent, or Firm* — Ladas & Parry, LLP

(57) ABSTRACT

The present application relates to a method for determining random access resources and a network device. The method comprises: the terminal device determines resources overlapping with a target time domain symbol in a random access resource group as unavailable resources, wherein, the target time domain symbol comprises at least one symbol, the at least one symbol is a symbol occupied by target remaining minimum system information (RMSI), the target RMSI comprises at least one RMSI associated with a target synchronization signal block (SSB), the target SSB comprises an actually transmitted SSB and an SSB having a quasi-co-located relationship with the actually transmitted SSB, and the unavailable resources are not used for random access.

16 Claims, 17 Drawing Sheets

(58) Field of Classification Search
CPC . H04W 8/06; H04W 28/0273; H04W 28/085; H04W 36/0066; H04W 36/0069; H04W 80/02; H04W 28/02; H04W 28/08; H04W 36/125; H04W 36/0022; H04W 48/17; H04W 74/0833; H04W 74/08; H04L 45/22; H04L 47/34; H04L 12/707; H04L 12/801; H04L 5/0007; H04L 5/0023; H04L 5/0044; H04L 5/0048; H04L 5/0053; H04L 5/00
USPC ............................................. 455/439
See application file for complete search history.

(56) References Cited

U.S. PATENT DOCUMENTS

| | | | | |
|---|---|---|---|---|
| 2019/0174550 | A1* | 6/2019 | Huang | H04L 5/0007 |
| 2019/0327755 | A1* | 10/2019 | Xiong | H04L 5/0046 |
| 2019/0327767 | A1 | 10/2019 | Islam et al. | |
| 2021/0022095 | A1* | 1/2021 | Jiang | H04L 27/0006 |
| 2021/0058931 | A1* | 2/2021 | Da | H04L 5/0053 |
| 2021/0136663 | A1* | 5/2021 | Liu | H04W 48/16 |
| 2021/0153091 | A1* | 5/2021 | Hosseini | H04W 76/15 |
| 2022/0053567 | A1* | 2/2022 | Lei | H04L 5/0048 |

FOREIGN PATENT DOCUMENTS

| | | |
|---|---|---|
| CN | 109802792 A | 5/2019 |
| CN | 109803440 A | 5/2019 |
| CN | 110168972 A | 8/2019 |
| CN | 110249582 A | 9/2019 |
| CN | 110446258 A | 11/2019 |
| CN | 111010742 A | 4/2020 |
| CN | 111867134 A | 10/2020 |
| EP | 3713367 A1 | 9/2020 |
| WO | 2019104299 A1 | 5/2019 |
| WO | 2019203930 A1 | 10/2019 |

OTHER PUBLICATIONS

Huawei, HiSilicon, "Remaining details of RACH Preambles" 3GPP TSG RAN WG1 Meeting #92bis R1-1803628 Sanya, China, Apr. 16-20, 2018, entire document.
InterDigital Inc. "On Remaining Details of NR Physical Random Access Channel" 3GPP TSG RAN WG1 Meeting #93 R1-1807011 Busan, South Korea, May 21-25, 2018, entire document.
Convida Wireless "Summary of Remaining details on PRACH formats"3GPP TSG RAN WG1 Meeting #92 R1-1803256 Athens, Greece, Feb. 26-Mar. 2, 2018, entire document.
First Office Action of the Chinese application No. 201911252878.3, issued on Apr. 6, 2021.
Third Office Action of the Chinese application No. 201911252878. 3, issued on Dec. 13, 2021.
International Search Report in the international application No. PCT/CN2020/127794, mailed on Jan. 27, 2021, and its English Translation provided by WIPO.
Written Opinion in the international application No. PCT/CN2020/127794, mailed on Jan. 27, 2021, and its English Translation provided by Google Translate.
Second Office Action of the Chinese application No. 201911252878. 3, issued on Sep. 13, 2021.
3GPP TSG RAN WG1 Meeting #97 R1-1907258, Reno, US, May 13-May 17th, 2019, Agenda item: 7.2.2.1.1, Source: Qualcomm Incorporated, Title: Initial access signals and channels for NR-U, Document for: Discussion and Decision, all pages.
3GPP TSG RAN WG1 Meeting #96 R1-1903404, Athens, Greece, Feb. 25-Mar. 1, 2019, Agenda item: 7.2.2.1.1, Source: Qualcomm Incorporated, Title: Feature lead summery on initial access signals and channels for NR-U, Document for: Discussion and Decision; all pages.
3GPP TS 38.214 v1.3.0 (Dec. 2017), 3rd Generation Partnership Project; Technical Specification Group Radio Access Network; NR; Physical layer procedures for data(Release 15), all pages.
Supplementary European Search Report in the corresponding European application No. 20899654.6, mailed on Dec. 16, 2022.
Notice of Allowance of the corresponding Chinese application No. 201911252878.3, issued on Apr. 19, 2022.

* cited by examiner

200

A resource in a random access resource group overlapping with a target time domain symbol is determined as an unavailable resource — S210

FIG. 2

METHOD FOR DETERMINING RANDOM ACCESS RESOURCE AND NETWORK DEVICE

CROSS-REFERENCE TO RELATED APPLICATION

The present application is a continuation of International Application No. PCT/CN2020/127794 filed on Nov. 10, 2020, which claims priority to Chinese patent application No. 201911252878.3 filed on Dec. 9, 2019, the disclosures of which are hereby incorporated by reference in their entirety.

TECHNICAL FIELD

The disclosure relates to the field of communication technologies, and particularly to a method for determining a random access resource and a network device.

BACKGROUND

In the 5th Generation (5G) New Radio (NR) system, a base station may configure a group of random access resources to a terminal, the group of random access resources exists periodically. Further, the protocol specifies a series of rules for determining which random access resources are valid or invalid in the group of random access resources.

Compared with the 5G NR system, in an unlicensed frequency band, there may be a problem of absence of static or semi-static uplink and downlink indications when the terminal determines the valid random access resources based on the given random access resources.

Because the NR-Unlicensed (NR-U) system occupies a channel based on a Listen Before Talk (LBT) mechanism, thus, resource positions available for the channel are uncertain. Because of this uncertainty, it is difficult for the network device to allocate which resources are uplink resources and which are downlink resources in advance. The best choice is to use signaling such as Downlink Control Information (DCI) to flexibly indicate uplink and downlink resources of the occupied channel in the occupied channel. This feature increases the complexity in determining effective random access resources in NR-U, especially in the initial access process, the terminal may not distinguish which random access resources are valid or invalid when the terminal does not obtain any configuration of the uplink and downlink resources.

SUMMARY

Embodiments of the disclosure provide a method for determining a random access resource and a network device.

In a first aspect, there is provided a resource allocation method, the method includes following operations. A terminal device determines a resource in a random access resource group overlapping with a target time domain symbol as an unavailable resource. The target time domain symbol includes at least one symbol occupied by target Remaining Minimum System Information (RMSI), the target RMSI includes at least one piece of RMSI associated with a target Synchronization Signal/Primary Broadcast CHannel (SS/PBCH) Block (SSB), the target SSB includes an actually transmitted SSB and an SSB having a Quasi Co-Loacted (QCL) relationship with the actually transmitted SSB, and the unavailable resource is not used for random access.

In a second aspect, there is provided a resource allocation method, the method includes following operations. A network device determines a resource in a random access resource group overlapping with a target time domain symbol as an unavailable resource. The target time domain symbol includes at least one symbol occupied by target Remaining Minimum System Information (RMSI), the target RMSI includes at least one piece of RMSI associated with a target Synchronization Signal/Primary Broadcast CHannel (SS/PBCH) Block (SSB), the target SSB includes an actually transmitted SSB and an SSB having a Quasi Co-Loacted (QCL) relationship with the actually transmitted SSB, and the unavailable resource is not used for random access.

In a third aspect, there is provided a network device, which includes a processor and a memory. The memory is configured to store a computer program, and the processor is configured to call and execute the computer program stored in the memory to execute the method in the second aspect or any of the implementations thereof.

BRIEF DESCRIPTION OF THE DRAWINGS

FIG. 2 is a schematic flowchart of a method for determining a random access resource according to an embodiment of the disclosure.

DETAILED DESCRIPTION

The following describes the technical solutions in the embodiments of the disclosure with reference to the accompanying drawings in the embodiments of the disclosure. Apparently, the described embodiments are some embodiments of the disclosure rather than all of the embodiments. All other embodiments obtained by a person of ordinary skill in the art based on the embodiments of the disclosure without creative efforts shall fall within the protection scope of the disclosure.

The technical solutions of the embodiments of the disclosure may be applied to various communications systems, such as: a Global System for Mobile Communications ("GSM" for short), a Code Division Multiple Access ("CDMA" for short) system, a Wideband Code Division Multiple Access ("WCDMA" for short), a General Packet Radio Service ("GPRS" for short), a Long Term Evolution ("LTE" for short) system, an LTE Frequency Division Duplex ("FDD" for short) system, an LTE Time Division Duplex ("TDD" for short) system, a Universal Mobile Telecommunications System ("UMTS" for short) system, a Worldwide Interoperability for Microwave Access ("WiMAX" for short) communications system, and a 5G communications system.

Figure 1:
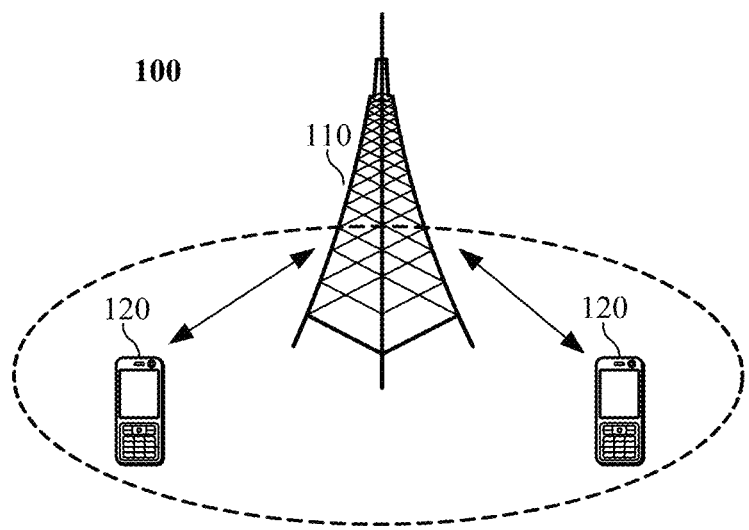
FIG. 1 is a schematic diagram of architecture of a communication system according to an embodiment of the disclosure.

As an example, FIG. 1 illustrates a communication system 100 applied in an embodiment of the disclosure. The communication system 100 may include a network device 110. The network device 110 may be a device communicating with a terminal device (also called as a communication terminal or a terminal). The network device 110 may provide communications coverage to a particular geographic area, and may communicate with a terminal device located within the coverage area. Optionally, the network device 110 may be a base transceiver station (BTS) in a GSM system or CDMA system, or may be a NodeB (NB) in a WCDMA system, or may be an evolved NodeB (eNB or eNodeB) in an LTE system, or a wireless controller in a cloud radio access network (CRAN), or the network device may be a mobile switching center, a relay station, an access point, an in-vehicle device, a wearable device, a hub, a switch, a bridge, a router, a network side device in a 5G network, a network device in a future evolved public land mobile network (PLMN) or the like.

The wireless communications system 100 further includes at least one terminal device 120 located within the coverage range of the network device 110. The "terminal device" used herein includes but is not limited to connection via: a wireline, such as via a public switched telephone network (PSTN), a digital subscriber line (DSL), a digital cable, a directness cable and/or another data connection/network; and/or a wireless interface, such as for a cellular network, a wireless local area network (WLAN), a digital television network of a DVB-H, a satellite network, an AM-FM broadcasting transmitter; and/or apparatus configured to receive or send communication signals in another terminal device; and/or a device of Internet of things (IoT). The terminal device configured to communicate via a wireless interface may be called as a "wireless communication terminal", a "wireless terminal" or a "mobile terminal". Examples of a mobile terminal include but are not limited to: a satellite telephone or a cellular telephone; a personal communications system (PCS) terminal that is capable of combining capabilities of cellular radio telephones, data process, faxes and data communication; a PDA that may include a cellular radiotelephone, a pager, an Internet/Intranet access, a Web browser, an organizer, a calendar and/or a global positioning system (GPS) receiver; and a conventional laptop and/or palmtop receiver or other electronic device that includes a radiotelephone transceiver. The terminal device may be an access terminal, user equipment (UE), a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in a 5G network, a terminal device in a future evolved PLMN or the like.

Optionally, the terminal devices 120 may perform device to device (D2D) communication with each other.

Optionally, the 5G system or network may be further referred to as an NR system or network.

FIG. 1 illustrates one network device and two terminal devices as an example. Optionally, the communication system 100 may include a plurality of network devices and coverage of each network device may include another quantity of terminal devices. This is not limited in the embodiment of the disclosure.

Optionally, the communication system 100 may further include other network entities such as a network controller and a mobility management entity. This is not limited in this embodiment of the disclosure.

It should be understood that, a device in the network/system of embodiments of the disclosure having a communication function may be referred to as a communication device. Taking the communication system 100 illustrated in FIG. 1 as an example, a communication device may include a network device 110 and a terminal device 120 having a communication function. The network device 110 and the terminal device 120 may be specific devices described above, details are not elaborated herein again. The communication device may further include other devices in the communication system 100, such as a network controller, a mobility management entity or the like. This is not limited in this embodiment of the disclosure.

It should be understood that, terms "system" and "network" in the disclosure are usually interchangeably used. The term "and/or" in the disclosure is only an association relationship for describing the associated objects, and represents that three relationships may exist, for example, A and/or B may represent the following three cases: A exists separately, both A and B exist, and B exists separately. In addition, the character "/" in this specification generally indicates an "or" relationship between the associated objects.

In the 5G NR system, a base station may configure a group of random access resources to UE, the group of random access resources exists periodically. Further, the protocol specifies a series of rules for determining which random access resources are valid or invalid in the group of random access resources. For example, random access resources in downlink resources may be invalid, random access resources in resources scheduled by DCI for transmission in flexible resources (e.g. flexible symbols) may be invalid, and random access resources in synchronization signal block transmission resources may be invalid.

Compared with the 5G NR system, in an unlicensed frequency band, there may be following two problems when the UE determines the valid random access resources based on the given random access resources: the first one is absence of static or semi-static uplink and downlink indications, and the second one is resource collision between RMSI and random access resources.

For the problem of absence of static or semi-static uplink and downlink indications, because the NR-U system occupies a channel based on a Listen Before Talk (LBT) mechanism, resource positions available for the channel are uncertain. Because of this uncertainty, it is difficult for the network device to allocate which resources are uplink resources and which are downlink resources in advance. The best choice is to use signaling such as Downlink Control Information (DCI) to flexibly indicate uplink and downlink resources of the occupied channel in the occupied channel. This feature increases the complexity in determining effective random access resources in NR-U, especially in the initial access process, the UE may not distinguish which random access resources are valid or invalid when the UE does not obtain any configuration of the uplink and downlink resources.

In addition, for the RMSI (i.e. System Information Block (SIB)1), in the 5G system, since the RMSI is transmitted in the downlink channel, upon the UE obtaining configuration of uplink and downlink resources, an operation of avoiding invalid random access resources based on RMSI resource is actually completed when the UE determines the invalid random access resources based on the downlink resources. However, in the NR-U, UE may not obtain the configuration of the uplink and downlink resources in the random access process. Under this situation, there is a problem required to be solved at present of how to deal with collision between the RMSI resources and the random access resources.

Therefore, embodiments of the disclosure propose a method for determining a random access resource, to solve the above problem. Specifically, FIG. 2 illustrates a schematic flowchart of a method 200 for determining a random access resource according to an embodiment of the disclosure. As illustrated in FIG. 2, the method 200 includes an operation S210 that a resource in a random access resource group overlapping with a target time domain symbol is determined as an unavailable resource. The target time domain symbol includes at least one symbol occupied by target RMSI, the target RMSI includes at least one piece of RMSI associated with a target SSB, the target SSB includes an actually transmitted SSB and an SSB having a QCL relationship with the actually transmitted SSB, and the unavailable resource is not used for random access.

It should be understood that the method 200 may be performed by a terminal device such as the terminal device illustrated in FIG. 1. Alternatively, the method 200 may also be performed by a network device such as the network device illustrated in FIG. 1. For convenience of description, the following description takes the terminal device performing the method 200 as an example, but likewise, it is applicable to the network device performing the method, which will not be elaborated herein again.

Alternatively, the method 200 may further include an operation of the terminal device obtaining a random access resource group. Specifically, the terminal device may receive a group of random access resources (i.e. the random access resource group in the embodiment of the present disclosure) configured by the network device, the resources in the group of random access resources may be used for a random access process. The group of random access resources may include at least one resource which includes a time domain resource and/or a frequency domain resource. Alternatively, resources in the random access resource group may be periodic resources or non-periodic resources, the embodiment of the disclosure is not limited thereto.

It should be understood that the resources in the random access resource group in the embodiment of the disclosure may include resources on an unlicensed spectrum, the terminal device and the network device may determine which resources are valid or invalid in the random access resource group, in which the invalid resources may not be used for random access, and the valid resources may be used for random access. Specifically, the method 200 may include an operation that the terminal device determines a resource used for random access from resources other than the unavailable resources in the random access resource group. That is, the terminal device may not use the unavailable resources for random access.

In an embodiment of the disclosure, the terminal device may determine an invalid resource by using the operation S210 in the method 200. Specifically, the terminal device determines the resource in the random access resource group overlapping with the target time domain symbol as the unavailable resource; in other words, the terminal device determines a resource in the random access resource group conflicting with the target time domain symbol as the unavailable resource; in other words, the terminal device determines a resource in the random access resource group colliding with the target time domain symbol as the unavailable resource; in other words, if a random access resource in the random access resource group overlaps or conflicts or collides with the target time domain symbol, then the random access resource is the unavailable resource; in other words, in the random access resource group, the resource on the target time domain symbol is determined as the unavailable resource, the embodiment of the disclosure is not limited thereto. The unavailable resource may also be called as an invalid resource, and may not be used for the random access process.

It should be understood that the target time domain symbol in the embodiments of the disclosure includes at least one symbol occupied by the target RMSI, that is, the target time domain symbol may include one or more time domain symbols occupied by the target RMSI. Alternatively, the time domain symbol in the embodiments of the disclosure may refer to an Orthogonal Frequency Division Multiplexing (OFDM) symbol. For example, one time domain symbol refers to one OFDM symbol, and the target time domain symbol may include at least one OFDM symbol, but the embodiment of the disclosure is not limited thereto.

In the embodiment of the disclosure, the target RMSI is associated with a target SSB which includes an actually transmitted SSB and an SSB having a QCL relationship with the actually transmitted SSB, that is, the target SSB may include one or more SSBs. Correspondingly, in the embodiments of the disclosure, the target RMSI includes at least one piece of RMSI associated with the target SSB, that is, the target RMSI may also include one or more pieces of RMSI.

Figure 3:
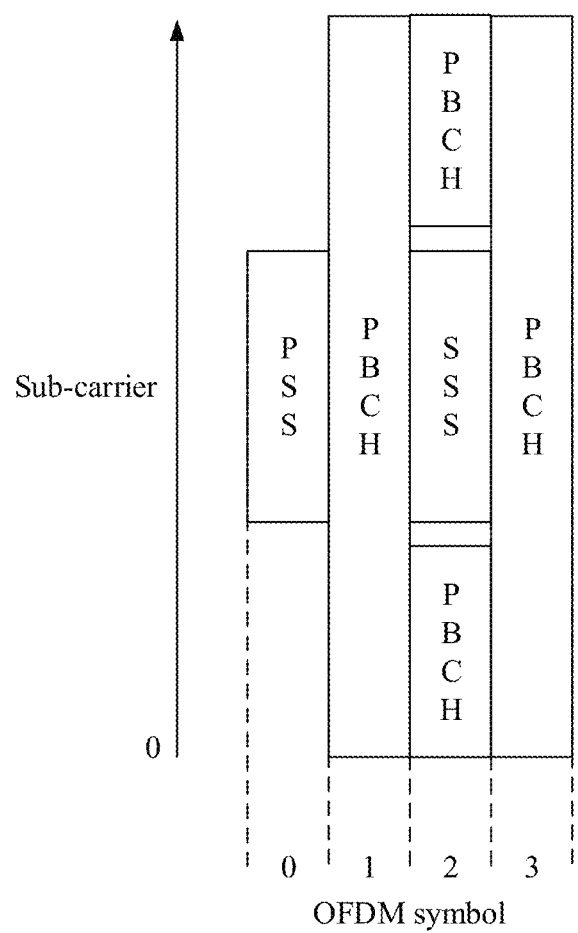
FIG. 3 is a schematic diagram of time-frequency resources occupied by an SSB according to an embodiment of the disclosure.

It should be understood that the SSB in the embodiments of the disclosure may refer to a Synchronization Signal (SS)/Physical Broadcast Channel (PBCH) block. For example, FIG. 3 illustrates a schematic diagram of time-frequency resources occupied by an SSB. As illustrated in FIG. 3, one SSB may include a Primary Synchronization Signal (PSS) on one OFDM symbol, a Secondary Synchronization Signal (SSS) on one OFDM symbol and NR-PBCHs on two OFDM symbols. In the time-frequency resources occupied by the PBCH, a Demodulation Reference Signal (DMRS) used for demodulating the PBCH may be included, but the embodiment of the disclosure is not limited thereto.

Alternatively, in an embodiment of the disclosure, the method 200 may further include an operation that the terminal device determines a target SSB. That is, the terminal device determines the actually transmitted SSB and the SSB having a QCL relationship with the actually transmitted SSB. The actually transmitted SSB is an SBB transmitted between the terminal device and the network device, or an SSB sent from the network device to the terminal device. Specifically, the operation that the terminal device determines the target SSB may include the following actions. The terminal device receives an SSB from the network device and determines the SSB as the actually transmitted SSB. The terminal device determines the SSB number of the actually transmitted SSB. The terminal device determines an SSB having a QCL relationship with the actually transmitted SSB according to the SSB number, in which both of the actually transmitted SSB and the SSB having the QCL relationship with the actually transmitted SSB belong to the target SSB.

Figure 4:
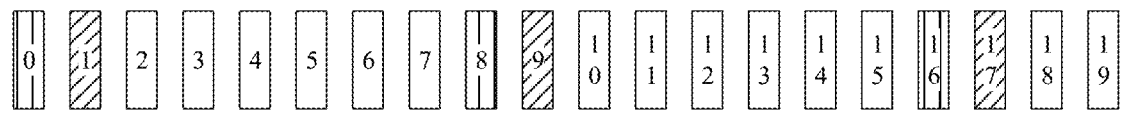
FIG. 4 is a schematic diagram of candidate transmission positions of SSBs according to an embodiment of the disclosure.

For example, FIG. 4 illustrates a schematic diagram of candidate transmission positions of SSBs. As illustrated in FIG. 4, it is assumed that the terminal device determines candidate transmission positions of 20 SSBs, numbers corresponding to candidate transmission positions are 0, 1, . . . , 19, respectively, the numbers are referred to as candidate SSB numbers herein. That is, the candidate SSB numbers are 0, 1, . . . , 19, and the candidate SSB number is used for representing the position of each candidate SSB. In addition, the terminal device may also determine an indication parameter Q for indicating the QCL relationship between the SSBs. For example, it is assumed that Q=8, then the possible SSB numbers of the actually transmitted SSBs may be determined as 0, 1, . . . , 7 according to the value of Q.

For the above candidate SSB numbers, as illustrated in FIG. 4, if one or more of SSBs with the candidate SSB numbers 0, 8 and 16 are used for transmission, these SSBs have a QCL relationship. Similarly, SSBs with candidate SSB numbers 1, 9 and 17 also have a QLC relationship, and so on. That is, when an SSB having an SSB number i is transmitted, i.e., the SSB number of the actually transmitted SSB is i, SSB candidate numbers corresponding to SSB may include i+n*Q, where n is an integer. In other words, a result of the candidate number of SSB modulo the indication parameter Q may be used as the SSB number which indicates the QCL characteristic relationship between SSBs, and the SSBs having a same number indicates that there is a QCL relationship between these SSBs.

Based on the above description, the target SSB includes the actually transmitted SSB and the SSB having a QCL relationship with the actually transmitted SSB. Then, taking FIG. 4 as an example, if the SSB number of the actually transmitted SSB is 0, the corresponding target SSB may include SSBs with candidate numbers 0, 8 and 16, and correspondingly, the target RMSI includes RMSI associated with these target SSBs.

It should be understood that when the network device needs to send a certain SSB to the terminal device, that is, when the network device needs to send the SSB with a certain SSB number, the SSB may be sent at one or more SSB candidate positions corresponding to the SSB number, and the one or more specific SSB candidate positions for sending the SSB depend on factors of the channel occupation situation of the network device, scheduling implementation of the network device and so on.

Alternatively, in an embodiment of the disclosure, the method 200 may further include the operation that the terminal device determines target RMSI, i.e., the terminal device determines the target RMSI associated with the target SSB according to the target SSB. Specifically, in the embodiment of the disclosure, each of the target RMSI may include a control portion and a data portion. That is, each of the target RMSI corresponds to a Physical Downlink Control CHannel (PDCCH) and/or a Physical Downlink Shared CHannel (PDSCH) for transmitting the RMSI, in which the PDCCH is used for scheduling the PDSCH.

Taking the third RMSI in the target RMSI as an example for description, in which the third RMSI is any one of the target RMSI. Specifically, the third RMSI corresponds to a third PDCCH and/or a third PDSCH. The third PDCCH corresponding to the third RMSI is used for carrying control information of the third RMSI, the control information indicates the third PDSCH corresponding to the third RMSI, and the third PDSCH is used for carrying data of the third RMSI.

In embodiments of the disclosure, the terminal device may determine the target RMSI associated with the target SSB based on the target SSB in a plurality of ways. For example, the way in which the terminal device determines the target RMSI associated with the target SSB based on the target SSB may be pre-configured, or may be indicated in a Master information block (MIB), or may be indicated in Radio Resource Control (RRC) signaling. For example, the terminal device may calculate the resource position of the PDCCH (for example, symbols occupied by the PDCCH) of the target RMSI corresponding to the target SSB based on the SSB number (or referred to as SSB index) of the target SSB or the candidate index of the SSB. In addition, the terminal device may also calculate the resource position of the PDSCH (for example, symbols occupied by the PDSCH) of the target RMSI through information in the PDCCH of the target RMSI.

Alternatively, in an embodiment of the disclosure, the method 200 may further include the operation that the terminal device determines a target time domain symbol, i.e. the terminal device determines at least one time domain symbol occupied by the target RMSI. For any target RMSI, the terminal device may determine the resource positions of the PDCCH and the PDSCH corresponding to the target RMSI by a network side configuration. Still taking the third RMSI as an example, the third PDCCH corresponding to the third RMSI is carried in a specific COntrol Resource SET (CORESET), which is referred to as a third CORESET herein. That is, the third CORESET may be used for the terminal device to detect the third PDCCH, or the third CORESET may be used for indicating a position of a resource of the third PDCCH. Alternatively, the third CORESET may be configured to the UE by the network side. Therefore, the determination of the target time domain symbol by the terminal device may include the following two cases.

In one case, the target time domain symbol determined by the terminal device may include a symbol occupied by at least one of the PDCCH or the PDSCH corresponding to the target RMSI. Specifically, when a certain random access resource in the random access resource group overlaps or collides with a symbol where the PDCCH of the target RMSI is located, the random access resource is an unavailable resource. In other words, in the random access resource group, the random access resource on the symbol where the PDCCH of the target RMSI is located is an unavailable resource.

In another case, the target time domain symbol determined by the terminal device may include a symbol occupied by a CORESET and/or the PDSCH corresponding to the target RMSI. Taking the third CORESET as an example, the third CORESET is used for the terminal device to detect the third PDCCH corresponding to the third RMSI. Specifically, when a certain random access resource in the random access resource group overlaps or collides with a symbol where the CORESET for detecting the PDCCH of the target RMSI is located, the random access resource is an unavailable resource. In other words, in the random access resource group, the random access resource on the symbol where the CORESET for detecting the PDCCH of the target RMSI is located is an unavailable resource.

Alternatively, in an embodiment of the disclosure, the method 200 may further include an operation that the terminal device determines a symbol occupied by the PDSCH corresponding to the target RMSI. That is, the terminal device determines the symbol occupied by the PDSCH in the target time domain symbol. Specifically, for any of the target RMSI, the terminal device may indicate a resource of a PDSCH corresponding to the RMSI through a PDCCH corresponding to the RMSI. That is, the PDCCH corresponding to the RMSI is used for scheduling the resource of the PDSCH corresponding to the RMSI.

Alternatively, when the network device schedules RMSI, if the resource position of the PDCCH corresponding to each RMSI is fixed relative to the resource position of the PDSCH scheduled by the PDCCH, the terminal device may only detect a PDCCH corresponding to one piece of RMSI, and calculate the scheduling situation of the PDSCHs corresponding to other RMSI based on the scheduling situation of the PDSCH scheduled in the PDCCH. Specifically, it is assumed that a relative position between a PDCCH and a PDSCH corresponding to each of the target RMSI in a slot where the PDCCH and the PDSCH are located is fixed, the method 200 may further include an operation that the terminal device determines a position of a PDSCH corresponding to one of the target RMSI based on the PDCCH corresponding to the RMSI, and calculates positions of PDSCHs corresponding to the other RMSI. That is, the terminal device determines a position of a symbol occupied by a first PDSCH corresponding to first RMSI according to a first PDCCH corresponding to the first RMSI, the first RMSI is any one of the target RMSI. The terminal device determines a position of a symbol occupied by a second PDSCH corresponding to second RMSI according to the position of the symbol occupied by the first PDSCH. The second RMSI is other RMSI other than the first RMSI in the target RMSI, the target time domain symbol includes the symbol occupied by the first PDSCH and the symbol occupied by the second PDSCH.

In an embodiment of the disclosure, the position of the symbol occupied by the first PDSCH corresponding to the first RMSI determined by the terminal device may be a position in a slot, or may also be a position in a half-slot. In the embodiments of the disclosure, the half-slot refers to a front half-slot or a later half-slot divided from one slot which is divided into the front half-slot and the later half-slot. Duration of a half-slot is equal to half of duration of one slot.

Alternatively, for the case of slot, the method 200 may include the following operations. The terminal device determines a position of a symbol occupied by the first PDSCH in a first slot according to the first PDCCH, the first slot is a slot where the first PDSCH is located. The terminal device determines a position of a symbol occupied by the second PDSCH in a second slot according to the position of the symbol occupied by the first PDSCH in the first slot, the second slot is a slot where the second PDSCH is located, the first slot and the second slot are different slots.

Figure 5:
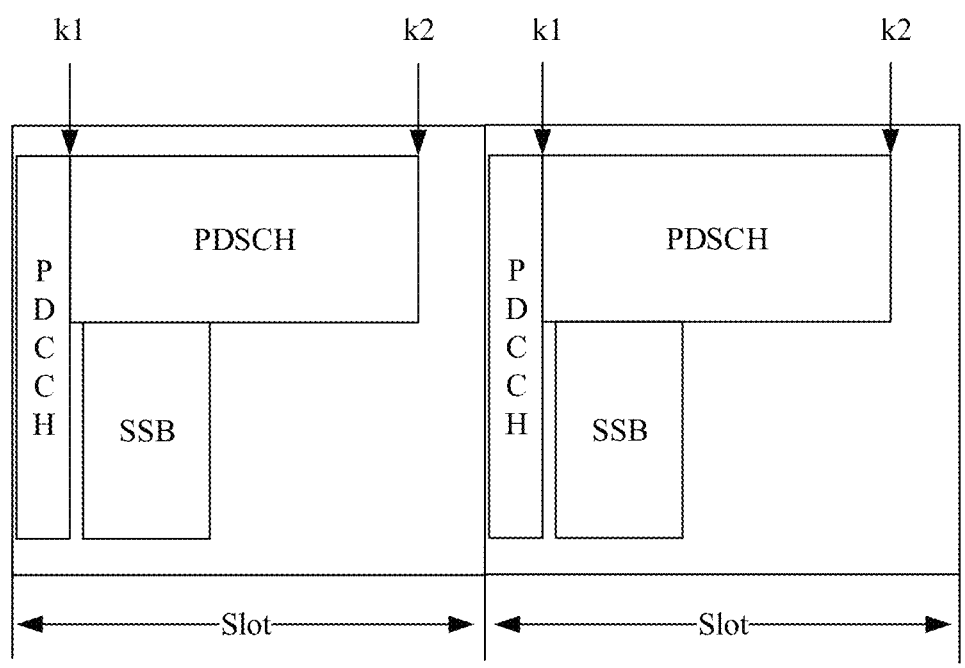
FIG. 5 is a schematic diagram of symbols occupied by PDSCHs according to an embodiment of the disclosure.

For the above case of slot, one slot may include one piece of RMSI. For example, as illustrated in FIG. 5, it is assumed that the terminal device detects a PDCCH (for example, the left PDCCH in FIG. 5) corresponding to one piece of RMSI, DCI on the PDCCH indicates that the PDSCH corresponding to the RMSI is located in the $k1^{th}$ to $k2^{th}$ symbols in a same slot of the PDCCH. The PDSCH may be the above first PDSCH. Then, when there is only one piece of RMSI in one slot, each PDSCH having the target RMSI is in the $k1^{th}$ to $k2^{th}$ symbol in a slot where the PDCCH of the target RMSI is located. That is, the positions of the symbols occupied by the PDSCHs of other RMSI may be determined according to the position of the first PDSCH in the slot.

Figure 6:
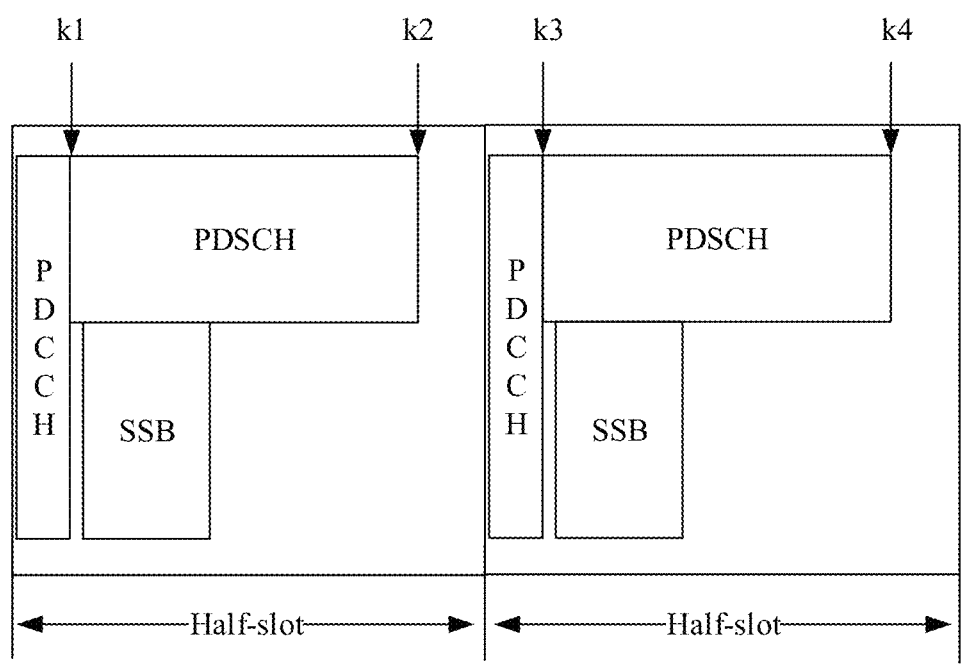
FIG. 6 is another schematic diagram of symbols occupied by PDSCHs according to an embodiment of the disclosure.

Alternatively, for the above case of slot, one slot may include two pieces of RMSI. For example, as illustrated in FIG. 6, the first RMSI determined by the terminal device may be any one of two pieces RMSI in one slot. Specifically, one slot includes two pieces of RMSI, and SSB numbers respectively corresponding to the two pieces of RMSI are different. As illustrated in FIG. 6, it may be assumed that a PDSCH of RMSI associated with an SSB with an even SSB number is located at the $k1^{th}$ to $k2^{th}$ symbols in the front half-slot of the slot where the SSB is located. A PDSCH of RMSI associated with an SSB with an odd SSB number is located at the $k3^{th}$ to $k4^{th}$ symbols in the later half-slot of the slot where the SSB is located. Then, the terminal device may determine that the symbols occupied by the first PDSCH are $k1^{th}$ to $k2^{th}$ symbols or $k3^{th}$ to $k4^{th}$ symbols in the first slot according to the first PDCCH corresponding to the first RMSI. Correspondingly, the terminal device may also determine that the symbols occupied by the second PDSCH are $k1^{th}$ to $k2^{th}$ symbols or $k3^{th}$ to $k4^{th}$ symbols in the second slot.

Alternatively, for a case of half-slot, the method 200 may further include the following operations. The terminal device determines a position of a symbol occupied by the first PDSCH in a first half-slot according to the first PDCCH, the first half-slot is a half-slot where the first PDSCH is located. The terminal device determines a position of a symbol occupied by the second PDSCH in a second half-slot according to the position of the symbol occupied by the first PDSCH in the first half-slot, the second half-slot is a half-slot where the second PDSCH is located.

In the above case of half-slot, generally, one slot may include at least two pieces of RMSI, herein, taking one slot including two pieces of RMSI as an example. In addition, in an embodiment of the disclosure, a first half-slot and a second half-slot may be located in a same slot or may be located in different slots.

Figure 7:
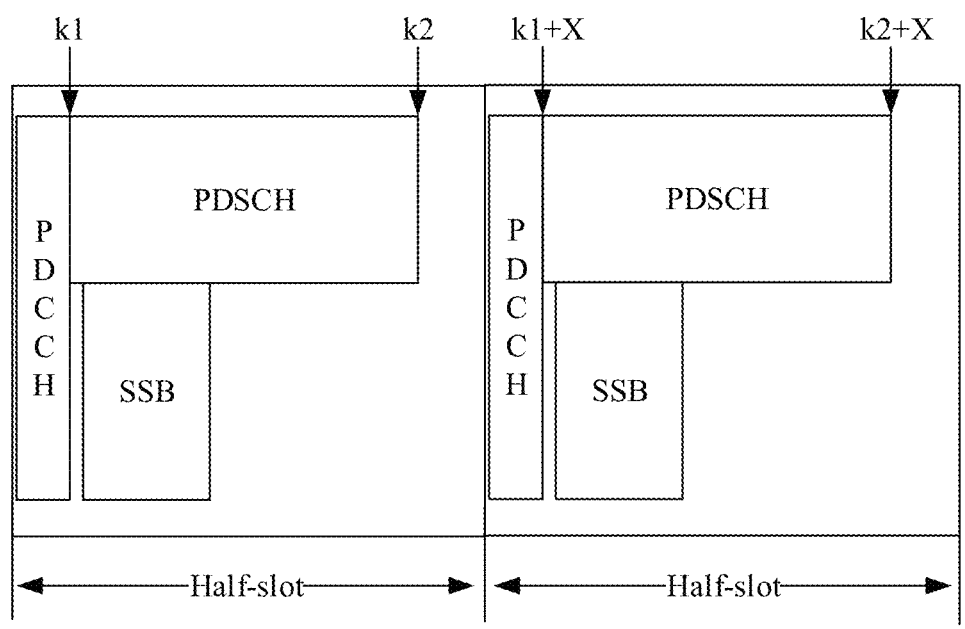
FIG. 7 is yet another schematic diagram of symbols occupied by PDSCHs according to an embodiment of the disclosure.

For example, as illustrated in FIG. 7, it is assumed that the first PDSCH having RMSI occupies the $k1^{th}$ to $k2^{th}$ symbols in the front half-slot in a slot, the first PDSCH having the RMSI is the first PDSCH, the slot where the first PDSCH is located is the first slot, and the front half-slot is the first half-slot. Then the terminal device may determine that the second PDSCH having RMSI occupies the $(k1+X)^{th}$ to $(k2+X)^{th}$ symbols in the later half-slot in the first slot, the second PDSCH having RMSI is the second PDSCH in the embodiment of the disclosure, and the later half-slot is the second half-slot. By such analogy, PDSCHs in the following one or more half-slots may also be determined based on the half-slots.

Figure 8:
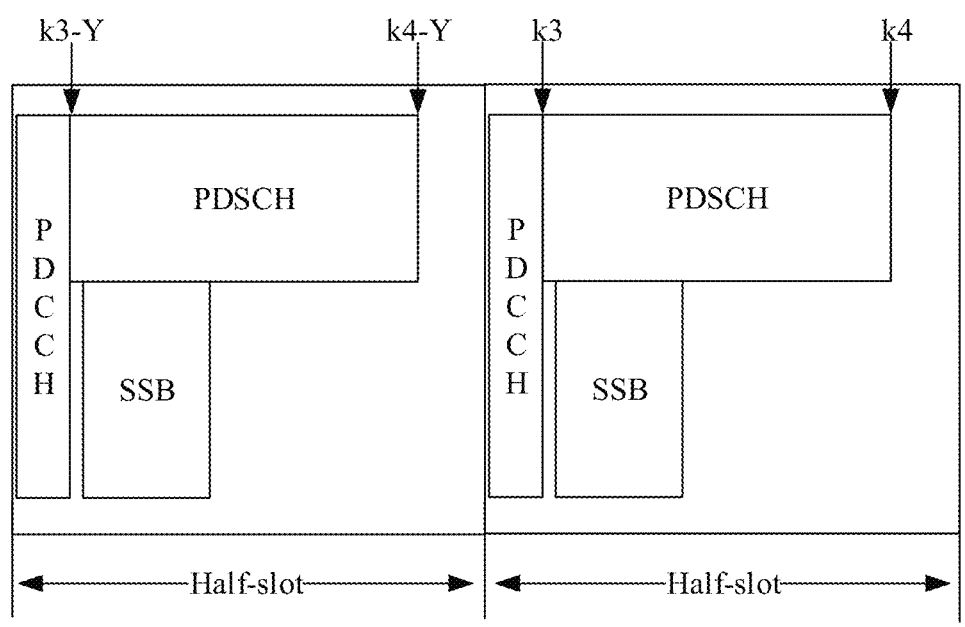
FIG. 8 is yet another schematic diagram of symbols occupied by PDSCHs according to an embodiment of the disclosure.

As another example, as illustrated in FIG. 8, it is assumed that a PDSCH of the second piece of RMSI occupies the $k3^{th}$ to $k4^{th}$ symbols in the later half-slot in a slot, in which the PDSCH is the first PDSCH, the slot where the first PDSCH is located is the first slot, and the later half-slot is the first half-slot. Then the terminal device may determine that the PDSCH of the first RMSI occupies the $(k3-Y)^{th}$ to $(k4-Y)^{th}$ symbols in the first slot, the PDSCH of the first RMSI is the second PDSCH in the embodiment of the disclosure, and the front half-slot is the second half-slot. By such analogy, PDSCHs in the following one or more half-slots may also be determined based on the half-slots.

It should be understood that the above X and/or Y may be a constant defined in the protocol in advance, or may also be notified by the network side to the terminal device, to facilitate the terminal device to determine the resource position of the PDSCH of each target RMSI.

It should be understood that the values or determination manners of k1 to k4 in the embodiments of the disclosure may be determined by the information carried in the PDCCH corresponding to the RMSI, or may be agreed by the protocol in advance, and the embodiments of the disclosure are not limited thereto.

Accordingly, in the embodiments of the disclosure, according to the method for determining a random access resource, the resource in the random access resource group conflicting with the time domain symbol occupied by the RMSI is determined as an unavailable resource, the problem of how to deal with the possible resource collision between the RMSI and random access resources in the unauthorized frequency band can be solved. Therefore, it is effectively ensured that the network device and the terminal device have consistent understanding of the valid random access resource, and random access information transmitted between the terminal device and the network device can be effectively received, and invalid transmission of a random access message can be avoided.

It should be understood that in the method 200, the terminal device and the network device determine the resource in the random access resource group conflicting with the target time domain symbol as an unavailable resource, that is to say, for some specific symbols, when the random access resource conflicts with the specific symbols, the random access resource is regarded as an unavailable random access resource. Similarly, a slot may also be used as an evaded resource, that is, random access resources colliding with some slots or half-slots are regarded as unavailable random access resources.

Specifically, as a first embodiment, the terminal device and the network device may determine a resource in the random access resource group overlapping with a target slot as an unavailable resource. In other words, for a certain random access resource in the random access resource group, if there is resource collision between the random access resource and the target slot, the random access resource is an unavailable resource. Herein, the target slot includes at least one slot where the target RMSI is located, the target RMSI includes at least one piece of RMSI associated with a target SSB, and the target SSB includes an actually transmitted SSB and an SSB having a QCL relationship with the actually transmitted SSB. The unavailable resource is not used for random access.

It should be understood that the concepts of the random access resource group, the target RMSI, and the unavailable resource in the embodiment are identical to those in the method 200, i.e., they are applicable to the description in the method 200 and details are not described herein again for the sake of brevity.

Specifically, the terminal device and the network device determine the target SSB which includes the actually transmitted SSB, and may also determine the SSB in the target SSB having a QCL relationship with the actually transmitted SSB based on the actually transmitted SSB. Correspondingly, the target RMSI associated with one or more SSBs in the target SSB is determined, and the target RMSI may include one or more pieces of RMSI. Further, one or more target slots where the one or more pieces of target RMSI are located may also be determined, that is, the target slot may include one or more slots.

Figure 9:
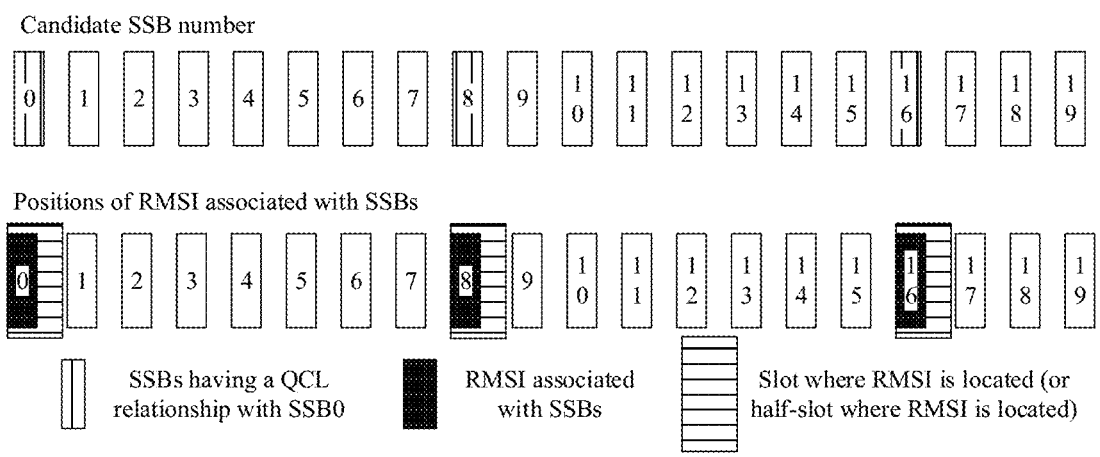
FIG. 9 is a schematic diagram of SSBs, RMSI and slots where the SSBs and RMSI are located according to an embodiment of the disclosure.
Figure 10:
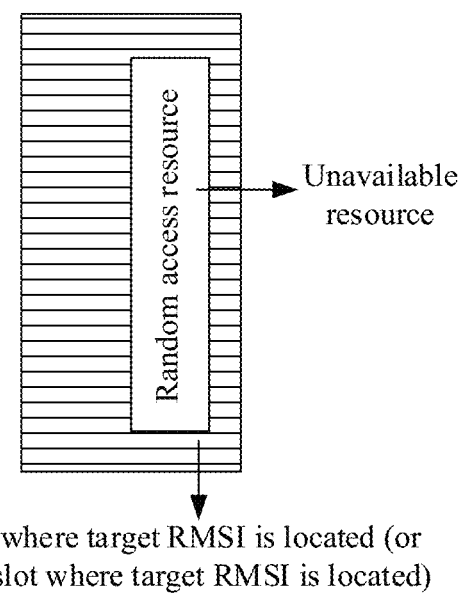
FIG. 10 is a schematic diagram of a slot or a half-slot where target RMSI is located according to an embodiment of the disclosure.

For example, as illustrated in FIG. 9, the description of the candidate SSB number is consistent with that of FIG. 4 and details are not described herein again. As illustrated in FIG. 9, it is assumed that one SSB corresponds to one piece of RMSI, and that the target SSB determined by the terminal device includes SSBs with the candidate numbers 0, 8 and 16, which are illustrated as blocks with vertical lines in FIG. 9. Correspondingly, the target RMSI includes three pieces of RMSI respectively associated with the SSBs, which are illustrated as black blocks in FIG. 9. The target slot includes three slots where the three pieces of target RMSI are located, and the three target slots are illustrated as blocks with horizontal lines in FIG. 9. For a target slot, as illustrated in FIG. 10, if there is a random access resource in the target slot where the target RMSI is located, the random access resource is an unavailable resource.

Alternatively, as a second embodiment, a half-slot may be taken as a unit rather than a slot in the above first embodiment. Specifically, the terminal device and the network device may determine a resource in the random access resource group overlapping with a target half-slot as an unavailable resource. In other words, for a certain random access resource in the random access resource group, if there is resource collision between the random access resource and the target half-slot, the random access resource is an unavailable resource. Herein, the target half-slot includes at least one half-slot where the target RMSI is located, the target RMSI includes at least one piece of RMSI associated with the target SSB. The target SSB includes an actual transmitted SSB and an SSB having a QCL relationship with the actual transmitted SSB, and the unavailable resource is not used for random access.

It should be understood that a main difference between the first embodiment and the second embodiment is that the first embodiment takes the slot where the RMSI is located as a determination range for determining the unavailable random access resource, while the second embodiment takes the half-slot where the RMSI is located as a determination range for determining the unavailable random access resources. In fact, these two embodiments correspond to different RMSI transmission manners. If the PDCCH and the PDSCH corresponding to the RMSI are limited in a slot and there are no additional limitations, the manner of the first embodiment is adapted. If the PDCCH and the PDSCH corresponding to the RMSI are limited to a half-slot, the manner of the second embodiment is adapted. For the sake of brevity, details will not be elaborated herein again.

For example, still as illustrated in FIG. 9, it is assumed that the target SSB determined by the terminal device includes the SSBs with candidate numbers 0, 8 and 16, which are illustrated as blocks with vertical lines in FIG. 9. Correspondingly, the target RMSI includes three pieces of RMSI respectively associated with the SSBs, which are illustrated as black blocks in FIG. 9. The target half-slot includes three half-slots where the three pieces of target RMSI are located, and the three target half-slots are illustrated as blocks with horizontal lines in FIG. 9. For the target half-slot, as illustrated in FIG. 10, if the target RMSI is limited in the half-slot, and if there is a random access resource in the half-slot, then the random access resource is an unavailable resource.

It should be understood that the first and second embodiments described above only limit the PDCCH and the PDSCH corresponding to the RMSI to be located in a slot or half-slot. If the PDCCH and the PDSCH corresponding to the RMSI and the associated SSBs are all limited in a slot or half-slot, the first embodiment may also be described as a third embodiment below, and the second embodiment may be described as a fourth embodiment below.

Alternatively, as a third embodiment, the terminal device and the network device may determine a resource in the random access resource group overlapping with a target slot as an unavailable resource. In other words, for a certain random access resource in the random access resource group, if there is resource collision between the random access resource and the target slot, the random access resource is an unavailable resource. Herein, the target slot includes at least one slot where the target SSB is located, the target SSB includes an actually transmitted SSB and an SSB having a QCL relationship with the actually transmitted SSB, and the unavailable resource is not used for random access.

It should be understood that the third embodiment corresponds to the first embodiment described above and will not be elaborated herein again for the sake of brevity.

Figure 11:
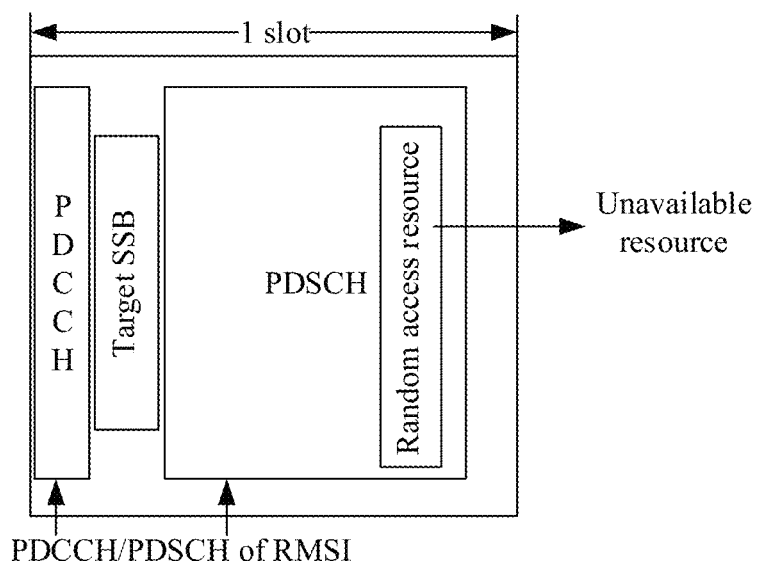
FIG. 11 is a schematic diagram of a slot where a target SSB is located according to an embodiment of the disclosure.

For example, as illustrated in FIG. 11, for any target SSB, the target SSB and the RMSI associated with the target SSB are located in a same slot, that is, the target SSB and the PDCCH/PDSCH corresponding to the RMSI associated with the SSB are located in the same slot, i.e., the target slot, then the random access resource in the random access resource group located in the target slot is an unavailable resource.

Alternatively, as a fourth embodiment, the terminal device and the network device may determine a resource in the random access resource group overlapping with a target half-slot as an unavailable resource. In other words, for a certain random access resource in the random access resource group, if there is resource collision between the random access resource and the target half-slot, the random access resource is an unavailable resource. Herein, the target half-slot includes at least one half-slot where the target SSB is located, the target SSB includes an actually transmitted SSB and an SSB having a QCL relationship with the actually transmitted SSB, and the unavailable resource is not used for random access.

It should be understood that the fourth embodiment corresponds to the second embodiment described above and will not be elaborated herein again for the sake of brevity.

Figure 12:
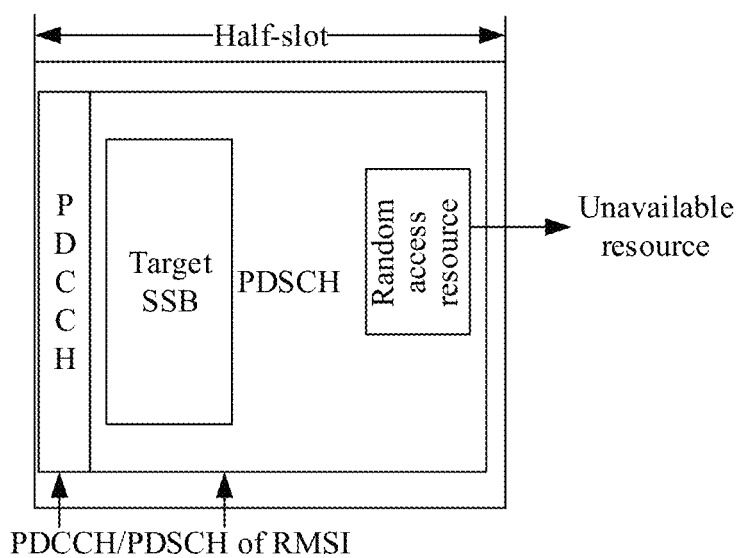
FIG. 12 is a schematic diagram of a half-slot where a target SSB is located according to an embodiment of the disclosure.

For example, as illustrated in FIG. 12, for any target SSB, the target SSB and the RMSI associated with the target SSB are located in a same half-slot, that is, the target SSB and the PDCCH/PDSCH corresponding to the RMSI associated with the SSB are located in the same half-slot, i.e., the target half-slot, then the random access resource in the random access resource group located in the target half-slot is an unavailable resource.

Accordingly, according to the above four embodiments in embodiments of the disclosure, the resource in the random access resource group conflicting with a slot or half-slot occupied by the RMSI is determined as an unavailable resource, the problem of how to deal with the possible resource collision between the RMSI and random access resources in the unauthorized frequency band can be solved. Therefore, it is effectively ensured that the network device and the terminal device have consistent understanding of the valid random access resource, and random access information transmitted between the terminal device and the network device can be effectively received, and invalid transmission of a random access message can be avoided.

It should be understood that in various embodiments of the disclosure, the size of the sequence number of the above-mentioned processes does not mean the execution order, and the execution order of various processes are determined by its function and inherent logic, and should not be limited in any way to the implementation process of the embodiments of the disclosure.

In addition, the term "and/or" in the disclosure is only an association relationship for describing the associated objects, and represents that three relationships may exist, for example, A and/or B may represent the following three cases: A exists separately, both A and B exist, and B exists separately. In addition, the character "/" in this specification generally indicates an "or" relationship between the associated objects.

The method for determining the random access resource according to the embodiments of the disclosure has been described in detail above with reference to FIG. 1 to FIG. 12. In the following, a terminal device and a network device according to an embodiment of the disclosure will be described with reference to FIG. 13 to FIG. 17.

Figure 13:
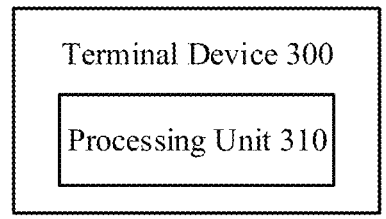
FIG. 13 is a schematic block diagram of a terminal device according to an embodiment of the disclosure.

As illustrated in FIG. 13, a terminal device 300 according to an embodiment of the disclosure includes a processing unit 310. Specifically, the processing unit 310 is configured to perform following operations. A resource in a random access resource group overlapping with a target time domain symbol is determined as an unavailable resource. The target time domain symbol includes at least one symbol occupied by target RMSI, the target RMSI includes at least one piece of RMSI associated with a target SSB, the target SSB includes an actually transmitted SSB and an SSB having a QCL relationship with the actually transmitted SSB, and the unavailable resource is not used for random access.

Optionally, as an embodiment, each of the target RMSI corresponds to at least one of a PDCCH or a PDSCH, and the PDCCH is used for scheduling the PDSCH. For example, a third PDCCH corresponding to third RMSI is used for carrying control information of the third RMSI, the control information indicates a third PDSCH corresponding to the third RMSI. The third PDSCH is used for carrying data of the third RMSI, and the third RMSI is one of the target RMSI.

Optionally, as an embodiment, the target time domain symbol includes at least one symbol occupied by at least one of the PDCCH or the PDSCH corresponding to the target RMSI.

Optionally, as an embodiment, the target time domain symbol includes at least one symbol occupied by at least one of a CORESET or the PDSCH corresponding to the target RMSI, and the CORESET is used for detecting the PDCCH.

Optionally, as an embodiment, a relative position between a PDCCH and a PDSCH corresponding to the target RMSI in a slot where the PDCCH and the PDSCH are located is fixed. The processing unit 310 is further configured to: determine a position of a symbol occupied by a first PDSCH corresponding to first RMSI according to a first PDCCH corresponding to the first RMSI, the first RMSI is one of the target RMSI; and determine a position of a symbol occupied by a second PDSCH corresponding to second RMSI according to the position of the symbol occupied by the first PDSCH. The second RMSI is an RMSI other than the first RMSI in the target RMSI, the target time domain symbol includes the symbol occupied by the first PDSCH and the symbol occupied by the second PDSCH.

Optionally, as an embodiment, the processing unit 310 is further configured to: determine a position of a symbol occupied by the first PDSCH in a first slot according to the first PDCCH, the first slot is a slot where the first PDSCH is located; and determine a position of a symbol occupied by the second PDSCH in a second slot according to the position of the symbol occupied by the first PDSCH in the first slot, the second slot is a slot where the second PDSCH is located, the first slot and the second slot are different slots.

Optionally, as an embodiment, one slot includes one or two pieces of RMSI, and SSB numbers respectively corresponding to the two pieces of RMSI are different.

Optionally, as an embodiment, the processing unit 310 is further configured to: determine a position of a symbol occupied by the first PDSCH in a first half-slot according to the first PDCCH, the first half-slot is a half-slot where the first PDSCH is located; and determine a position of a symbol occupied by the second PDSCH in a second half-slot according to the position of the symbol occupied by the first PDSCH in the first half-slot, the second half-slot is a half-slot where the second PDSCH is located.

Optionally, as an embodiment, one slot includes two pieces of RMSI, and the first half-slot and the second half-slot belong to a same slot.

Optionally, as an embodiment, the processing unit 310 is further configured to: determine an SSB received from a network device as the actually transmitted SSB; determine an SSB number of the actually transmitted SSB; and determine the SSB having the QCL relationship with the actually transmitted SSB according to the SSB number.

Optionally, as an embodiment, the target time domain symbol is at least one OFDM symbol.

Optionally, as an embodiment, the processing unit 310 is further configured to determine a resource used for random access from resources other than the unavailable resource in the random access resource group.

It should be understood that the terminal device 300 according to the embodiment of the disclosure may correspondingly perform the method 200 in the embodiment of the disclosure, and the above and other operations and/or functions of various unit in the terminal device 300 are used for performing the respective flows of the terminal device in the methods in FIG. 1 to FIG. 12, details will not be elaborated herein again for the sake of brevity.

Accordingly, according to the terminal device in the embodiment of the disclosure, the resource in the random access resource group conflicting with the time domain symbol occupied by the RMSI is determined as an unavailable resource, the problem of how to deal with the possible resource collision between the RMSI and random access resources in the unauthorized frequency band can be solved. Therefore, it is effectively ensured that the network device and the terminal device have consistent understanding of the valid random access resource, and random access information transmitted between the terminal device and the network device can be effectively received, and invalid transmission of a random access message can be avoided.

Figure 14:
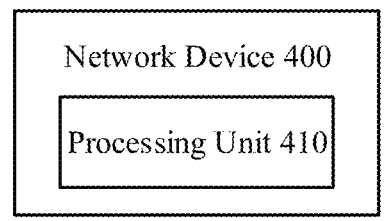
FIG. 14 is a schematic block diagram of a network device according to an embodiment of the disclosure.

As illustrated in FIG. 14, a network device 400 according to an embodiment of the disclosure includes a processing unit 410. Specifically, the processing unit 410 is configured to perform following operations. A resource in a random access resource group overlapping with a target time domain symbol is determined as an unavailable resource. The target time domain symbol includes at least one symbol occupied by target RMSI, the target RMSI includes at least one piece of RMSI associated with a target SSB, the target SSB includes an actually transmitted SSB and an SSB having a QCL relationship with the actually transmitted SSB, and the unavailable resource is not used for random access.

Optionally, as an embodiment, each of the target RMSI corresponds to at least one of a PDCCH or a PDSCH, and the PDCCH is used for scheduling the PDSCH. For example, a third PDCCH corresponding to third RMSI is used for carrying control information of the third RMSI, the control information indicates a third PDSCH corresponding to the third RMSI. The third PDSCH is used for carrying data of the third RMSI, and the third RMSI is one of the target RMSI.

Optionally, as an embodiment, the target time domain symbol includes a symbol occupied by at least one of the PDCCH or the PDSCH corresponding to the target RMSI.

Optionally, as an embodiment, the target time domain symbol includes a symbol occupied by at least one of a CORESET or the PDSCH corresponding to the target RMSI, and the CORESET is used for a terminal device to detect the PDCCH.

Optionally, as an embodiment, a relative position between a PDCCH and a PDSCH corresponding to the target RMSI in a slot where the PDCCH and the PDSCH is located is fixed. The processing unit 410 is further configured to: determine a position of a symbol occupied by a first PDSCH corresponding to first RMSI according to a first PDCCH corresponding to the first RMSI, the first RMSI is one of the target RMSI; and determine a position of a symbol occupied by a second PDSCH corresponding to second RMSI according to the position of the symbol occupied by the first PDSCH. The second RMSI is an RMSI other than the first RMSI in the target RMSI, the target time domain symbol includes the symbol occupied by the first PDSCH and the symbol occupied by the second PDSCH.

Optionally, as an embodiment, the processing unit 410 is further configured to: determine a position of a symbol occupied by the first PDSCH in a first slot according to the first PDCCH, the first slot is a slot where the first PDSCH is located; and determine a position of a symbol occupied by the second PDSCH in a second slot according to the position of the symbol occupied by the first PDSCH in the first slot, the second slot is a slot where the second PDSCH is located, the first slot and the second slot are different slots.

Optionally, as an embodiment, one slot includes one or two pieces of RMSI, and SSB numbers respectively corresponding to the two pieces of RMSI are different.

Optionally, as an embodiment, the processing unit 410 is further configured to: determine a position of a symbol occupied by the first PDSCH in a first half-slot according to the first PDCCH, the first half-slot is a half-slot where the first PDSCH is located; and determine a position of a symbol occupied by the second PDSCH in a second half-slot according to the position of the symbol occupied by the first PDSCH in the first half-slot, the second half-slot being a half-slot where the second PDSCH is located.

Optionally, as an embodiment, one slot includes two pieces of RMSI, and the first half-slot and the second half-slot belong to a same slot.

Optionally, as an embodiment, the processing unit 410 is further configured to: determine an SSB sent to a terminal device as the actually transmitted SSB; determine an SSB number of the actually transmitted SSB; and determine the SSB having the QCL relationship with the actually transmitted SSB according to the SSB number.

Optionally, as an embodiment, the target time domain symbol is at least one OFDM symbol.

Optionally, as an embodiment, the processing unit 410 is further configured to determine a resource used for random access from resources other than the unavailable resource in the random access resource group.

It should be understood that the network device 400 according to the embodiment of the disclosure may correspondingly perform the method 200 in the embodiment of the disclosure, and the above and other operations and/or functions of each unit in the network device 400 are used for performing the respective flows of the network device in the methods in FIG. 1 to FIG. 12, details will not be elaborated herein again for the sake of brevity.

Accordingly, according to the network device in the embodiment of the disclosure, the resource in the random access resource group conflicting with the time domain symbol occupied by the RMSI is determined as an unavailable resource, the problem of how to deal with the possible resource collision between the RMSI and random access resources in the unauthorized frequency band can be solved. Therefore, it is effectively ensured that the network device and the terminal device have consistent understanding of the valid random access resource, and random access information transmitted between the terminal device and the network device can be effectively received, and invalid transmission of a random access message can be avoided.

Figure 15:
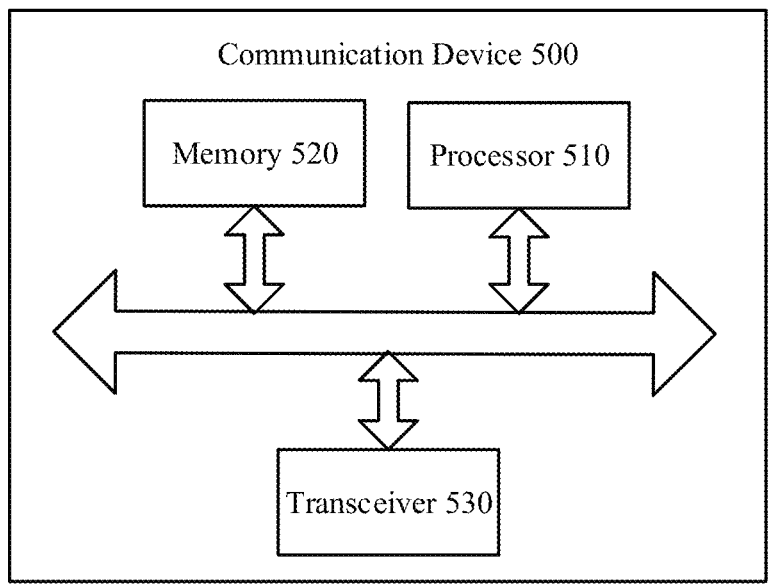
FIG. 15 is a schematic block diagram of a communication device according to an embodiment of the disclosure.

FIG. 15 is a schematic structure diagram of a communication device 500 according to an embodiment of the invention. The communication device 500 illustrated in FIG. 15 includes a processor 510. The processor 510 may be configured to call and execute the computer program stored in a memory to implement the method according to an embodiment of the disclosure.

Optionally, as illustrated in FIG. 15, the communication device 500 may further include a memory 520. The processor 510 may be configured to call and execute the computer program stored in the memory 520 to implement the method according to an embodiment of the disclosure.

The memory 520 may be an individual device independent from the processor 510, or may be integrated in the processor 510.

Optionally, as illustrated in FIG. 15, the communication device 500 may further include a transceiver 530. The processor 510 may control the transceiver 530 to communicate with other devices, specifically, to transmit information or data to other devices, or receive information or data from other devices.

The transceiver 530 may include a transmitter and a receiver. The transceiver 530 may further include an antenna, the number of the antenna may be one or more.

Optionally, the communication device 500 may specifically be a network device in embodiments of the disclosure. The communication device 500 may implement corresponding processes that are implemented by the network device in various methods of the embodiments of the disclosure. For brevity, details are not described herein again.

Optionally, the communication device 500 may specifically be a mobile terminal/terminal device in embodiments of the disclosure. The communication device 500 may implement corresponding processes that are implemented by the mobile terminal/terminal device in various methods of the embodiments of the disclosure. For brevity, details are not described herein again.

Figure 16:
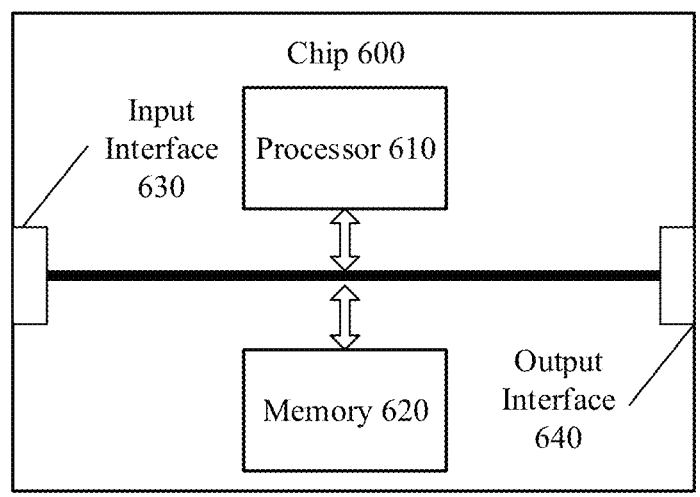
FIG. 16 is a schematic block diagram of a chip according to an embodiment of the disclosure.

FIG. 16 is a schematic diagram of a chip according to an embodiment of the disclosure. The chip 600 illustrated in FIG. 16 includes a processor 610. The processor 610 may be configured to call and execute the computer program stored in a memory to implement the method according to an embodiment of the disclosure.

Optionally, as illustrated in FIG. 16, the chip 600 may further include a memory 620. The processor 610 may be configured to call and execute the computer program stored in the memory 620 to implement the method according to an embodiment of the disclosure.

The memory 620 may be an individual device independent from the processor 610, or may be integrated in the processor 610.

Optionally, the chip 600 may further include an input interface 630. The processor 610 may control the input interface 630 to communicate with other devices or chips, specifically, to obtain information or data from other devices or chips.

Optionally, the chip 600 may further include an output interface 640. The processor 610 may control the output interface 640 to communicate with other devices or chips, specifically, to output information or data to other devices or chips.

Optionally, the chip may be applied to a network device in embodiments of the disclosure. The chip may implement corresponding processes that are implemented by the network device in various methods of the embodiments of the disclosure. For brevity, details are not described herein again.

Optionally, the chip may be applied to a mobile terminal/terminal device in embodiments of the disclosure. The chip may implement corresponding processes that are implemented by the mobile terminal/terminal device in various methods of the embodiments of the disclosure. For brevity, details are not described herein again.

It should be understood that, the chip mentioned in the embodiments of the disclosure may be also referred to a system-level chip, a system chip, a chip system or a chip of a system on chip, etc.

Figure 17:
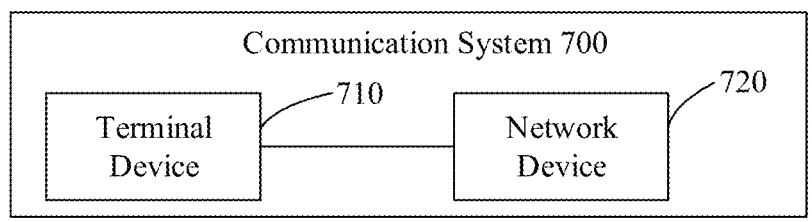
FIG. 17 is a schematic diagram of a communication system according to an embodiment of the disclosure.

FIG. 17 is a schematic block diagram of a communication system 700 according to an embodiment of the invention. As illustrated in FIG. 17, the communication system 700 includes a terminal device 710 and a network device 720.

The terminal device 710 may be configured to implement corresponding functions that are implemented by the terminal device of the above method. And the network device 720 may be configured to implement corresponding functions that are implemented by the network device of the above method. For brevity, details are not described herein again.

It should be understood that, the processor of the embodiment of the disclosure may be an integrated circuit chip, and has a signal processing capability. During implementation, the steps of the foregoing method embodiments may be implemented by using a hardware integrated logic circuit in the processor or implemented by using an instruction in a software form. The foregoing processor may be a general purpose processor, a digital signal processor (DSP), an application-specific integrated circuit (ASIC), a field programmable gate array (FPGA), or another programmable logical device, discrete gate or transistor logical device, or discrete hardware component. The processor may implement or perform methods, steps and logical block diagrams disclosed in the embodiments of the disclosure. The general purpose processor may be a microprocessor or the processor may be any conventional processor and the like. Steps of the methods disclosed with reference to the embodiments of the disclosure may be directly executed and completed by means of a hardware decoding processor, or may be executed and completed by using a combination of hardware and software modules in the decoding processor. The software module may be located in a mature storage medium in the field, such as a random access memory, a flash memory, a read-only memory, a programmable read-only memory, an electrically-erasable programmable memory, or a register. The storage medium is located in the memory, and the processor reads information in the memory and completes the steps in the foregoing methods in combination with hardware of the processor.

It can be understood that, the memory in the embodiments of the disclosure may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM) or a flash memory. The volatile memory may be a random access memory (RAM), and is used as an external cache. Through exemplary but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM) and a direct rambus random access memory (DR RAM). It should be noted that, the memory for the system and the method described herein aims to include but not limited to these memories and any other suitable types of memories.

It should be understood that, the foregoing memory is exemplary but not limitative description, for example, the memory in the embodiments of the disclosure may be a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synch link dynamic random access memory (SLDRAM) and a direct rambus random access memory (DR RAM), etc. It should be noted that, the memory in the embodiments of the disclosure aims to include but not limited to these memories and any other suitable types of memories.

An embodiment of the disclosure further provides a computer-readable storage medium, configured to store a computer program.

Optionally, the computer-readable storage medium may be applied to a network device in embodiments of the disclosure, and the computer program causes a computer to implement corresponding processes that are implemented by the network device in various methods of the embodiments of the disclosure. For brevity, details are not described herein again.

Optionally, the computer-readable storage medium may be applied to a mobile terminal/terminal device in embodiments of the disclosure, and the computer program causes a computer to implement corresponding processes that are implemented by the mobile terminal/terminal device in various methods of the embodiments of the disclosure. For brevity, details are not described herein again.

An embodiment of the disclosure further provides a computer program product including a computer program.

Optionally, the computer program product may be applied to a network device in embodiments of the disclosure, and the computer program instructions cause a computer to implement corresponding processes that are implemented by the network device in various methods of the embodiments of the disclosure. For brevity, details are not described herein again.

Optionally, the computer program product may be applied to a mobile terminal/terminal device in embodiments of the disclosure, and the computer programs cause a computer to implement corresponding processes that are implemented by the mobile terminal/terminal device in various methods of the embodiments of the disclosure. For brevity, details are not described herein again.

An embodiment of the disclosure further provides a computer program.

Optionally, the computer program may be applied to a network device in embodiments of the disclosure, when the computer program is executed by a computer, it causes the computer to implement corresponding processes that are implemented by the network device in various methods of the embodiments of the disclosure. For brevity, details are not described herein again.

Optionally, the computer program may be applied to a mobile terminal/terminal device in embodiments of the disclosure, when the computer program is executed by a computer, it causes the computer to implement corresponding processes that are implemented by the mobile terminal/terminal device in various methods of the embodiments of the disclosure. For brevity, details are not described herein again.

According to the above technical solution, the resource in the random access resource group conflicting with the time domain symbol occupied by the RMSI is determined as an unavailable resource, the problem of how to deal with the possible resource collision between the RMSI and random access resources in the unauthorized frequency band can be solved. Therefore, it is effectively ensured that the network device and the terminal device have consistent understanding of the valid random access resource, and random access information transmitted between the terminal device and the network device can be effectively received, and invalid transmission of a random access message can be avoided.

A person of ordinary skill in the art may be aware that, in combination with the examples described in the embodiments disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other schemes. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional module and sold or used as an independent product, the functions may be stored in a computer-readable storage medium. Based on such an understanding, the technical solutions of this application essentially, or the part contributing to the prior art, or part of the technical solutions may be implemented in the form of a software product. The computer software product is stored in a storage medium, and includes several instructions for instructing a computer device (which may be a personal computer, a server, a network device, and the like) to perform all or a part of the steps of the method described in the embodiment of the disclosure. The foregoing storage medium includes: any medium that can store program codes, such as a USB flash disk, a removable hard disk, a read-only memory (ROM), a random access memory (RAM), a magnetic disk, or an optical disk.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A method for determining a random access resource, comprising:
   determining, by a terminal device, a resource in a random access resource group overlapping with a target time domain symbol as an unavailable resource,
   wherein the target time domain symbol comprises at least one symbol occupied by target Remaining Minimum System Information (RMSI), the target RMSI comprises at least one piece of RMSI associated with a target Synchronization Signal/Primary Broadcast CHannel (SS/PBCH) Block (SSB), the target SSB comprises an actually transmitted SSB and an SSB having a Quasi Co-Located (QCL) relationship with the actually transmitted SSB, and the unavailable resource is not used for random access, wherein a relative position between a Physical Downlink Control Channel (PDCCH) and a Physical Downlink Shared Channel (PDSCH) corresponding to each of the target RMSI in a slot where the PDCCH and the PDSCH are located is fixed, and the method further comprises:
   determining, by the terminal device, a position of a symbol occupied by a first PDSCH corresponding to first RMSI according to a first PDCCH corresponding to the first RMSI, the first RMSI being one of the target RMSI; and
   determining, by the terminal device, a position of a symbol occupied by a second PDSCH corresponding to second RMSI according to the position of the symbol occupied by the first PDSCH, the second RMSI being RMSI other than the first RMSI in the target RMSI, and the target time domain symbol comprising the symbol occupied by the first PDSCH and the symbol occupied by the second PDSCH.

2. The method of claim 1, wherein the target time domain symbol further comprises a symbol occupied by at least one of the PDCCH or the PDSCH corresponding to the target RMSI.

3. The method of claim 1, wherein the target time domain symbol further comprises a symbol occupied by at least one of a Control-REsource SET (CORESET) or the PDSCH corresponding to the target RMSI, and the CORESET is used for detecting the PDCCH.

4. The method of claim 1, wherein determining, by the terminal device, the position of the symbol occupied by the first PDSCH corresponding to the first RMSI according to the first PDCCH corresponding to the first RMSI comprises:
   determining, by the terminal device, a position of a symbol occupied by the first PDSCH in a first slot according to the first PDCCH, the first slot being a slot where the first PDSCH is located; and
   determining, by the terminal device, the position of the symbol occupied by the second PDSCH corresponding to the second RMSI according to the position of the symbol occupied by the first PDSCH comprises:
   determining, by the terminal device, a position of a symbol occupied by the second PDSCH in a second slot according to the position of the symbol occupied by the first PDSCH in the first slot, the second slot being a slot where the second PDSCH is located, the first slot and the second slot being different slots.

5. The method of claim 4, wherein one slot comprises one piece of RMSI, or one slot comprises two pieces of RMSI, and SSB numbers respectively corresponding to the two pieces of RMSI are different.

6. The method of claim 1, wherein determining, by the terminal device, the position of the symbol occupied by the first PDSCH corresponding to the first RMSI according to the first PDCCH corresponding to the first RMSI comprises:
   determining, by the terminal device, a position of a symbol occupied by the first PDSCH in a first half-slot according to the first PDCCH, the first half-slot being a half-slot where the first PDSCH is located; and
   determining, by the terminal device, the position of the symbol occupied by the second PDSCH corresponding to the second RMSI according to the position of the symbol occupied by the first PDSCH comprises:
   determining, by the terminal device, a position of a symbol occupied by the second PDSCH in a second half-slot according to the position of the symbol occupied by the first PDSCH in the first half-slot, the second half-slot being a half-slot where the second PDSCH is located.

7. The method of claim 6, wherein one slot comprises two pieces of RMSI, and the first half-slot and the second half-slot belong to a same slot.

8. The method of claim 1, further comprising:
   determining, by the terminal device, an SSB received from a network device as the actually transmitted SSB;
   determining, by the terminal device, an SSB number of the actually transmitted SSB; and
   determining, by the terminal device, the SSB having the QCL relationship with the actually transmitted SSB according to the SSB number.

9. A method for determining a random access resource, comprising:
   determining, by a network device, a resource in a random access resource group overlapping with a target time domain symbol as an unavailable resource,
   wherein the target time domain symbol comprises at least one symbol occupied by target Remaining Minimum System Information (RMSI), the target RMSI comprises at least one piece of RMSI associated with a target Synchronization Signal/Primary Broadcast CHannel (SS/PBCH) Block (SSB), the target SSB comprises an actually transmitted SSB and an SSB having a Quasi Co-Located (QCL) relationship with the actually transmitted SSB, and the unavailable resource is not used for random access, wherein a relative position between a Physical Downlink Control Channel (PDCCH) and a Physical Downlink Shared Channel PDSCH) corresponding to each of the target RMSI in a slot where the PDCCH and the PDSCH are located is fixed, and the method further comprises:
   determining, by the network device, a position of a symbol occupied by a first PDSCH corresponding to first RMSI according to a first PDCCH corresponding to the first RMSI, the first RMSI being one of the target RMSI; and
   determining, by the network device, a position of a symbol occupied by a second PDSCH corresponding to second RMSI according to the position of the symbol occupied by the first PDSCH, the second RMSI being RMSI other than the first RMSI in the target RMSI, and the target time domain symbol comprising the symbol occupied by the first PDSCH and the symbol occupied by the second PDSCH.

10. The method of claim 9, wherein the target time domain symbol further comprises a symbol occupied by at least one of the PDCCH or the PDSCH corresponding to the target RMSI, or,
    the target time domain symbol further comprises a symbol occupied by at least one of a Control-REsource SET (CORESET) or the PDSCH corresponding to the target RMSI, and the CORESET is used for a terminal device to detect the PDCCH.

11. The method of claim 9, wherein determining, by the network device, the position of the symbol occupied by the first PDSCH corresponding to the first RMSI according to the first PDCCH corresponding to the first RMSI comprises:
    determining, by the network device, a position of a symbol occupied by the first PDSCH in a first slot according to the first PDCCH, the first slot being a slot where the first PDSCH is located; and
    determining, by the network device, the position of the symbol occupied by the second PDSCH corresponding to the second RMSI according to the position of the symbol occupied by the first PDSCH comprises:
    determining, by the network device, a position of a symbol occupied by the second PDSCH in a second slot according to the position of the symbol occupied by the first PDSCH in the first slot, the second slot being a slot where the second PDSCH is located, the first slot and the second slot being different slots.

12. The method of claim 11, wherein one slot comprises one piece of RMSI, or one slot comprises two pieces of RMSI, and SSB numbers respectively corresponding to the two pieces of RMSI are different.

13. The method of claim 9, wherein determining, by the network device, the position of the symbol occupied by the first PDSCH corresponding to the first RMSI according to the first PDCCH corresponding to the first RMSI comprises:
    determining, by the network device, a position of a symbol occupied by the first PDSCH in a first half-slot according to the first PDCCH, the first half-slot being a half-slot where the first PDSCH is located; and
    determining, by the network device, the position of the symbol occupied by the second PDSCH corresponding to the second RMSI according to the position of the symbol occupied by the first PDSCH comprises:
    determining, by the network device, a position of a symbol occupied by the second PDSCH in a second half-slot according to the position of the symbol occupied by the first PDSCH in the first half-slot, the second half-slot being a half-slot where the second PDSCH is located.

14. The method of claim 13, wherein one slot comprises two pieces of RMSI, and the first half-slot and the second half-slot belong to a same slot.

15. The method of claim 9, further comprising:
    determining, by the network device, an SSB sent to a terminal device as the actually transmitted SSB;
    determining, by the network device, an SSB number of the actually transmitted SSB; and
    determining, by the network device, the SSB having the QCL relationship with the actually transmitted SSB according to the SSB number.

16. A network device, comprising:
    a processor; and
    a memory for storing a computer program,
    wherein the processor is configured to call and run the computer program stored in the memory to execute the following operations:
    determining a resource in a random access resource group overlapping with a target time domain symbol as an unavailable resource,
    wherein the target time domain symbol comprises at least one symbol occupied by target Remaining Minimum System Information (RMSI), the target RMSI comprises at least one piece of RMSI associated with a target Synchronization Signal/Primary Broadcast CHannel (SS/PBCH) Block (SSB), the target SSB comprises an actually transmitted SSB and an SSB having a Quasi Co-Located (QCL) relationship with the actually transmitted SSB, and the unavailable resource is not used for random access, wherein a relative position between a Physical Downlink Control Channel (PDCCH) and a Physical Downlink Shared Channel (PDSCH) corresponding to each of the target RMSI in a slot where the PDCCH and the PDSCH are located is fixed, and the processor is further configured to:
    determine a position of a symbol occupied by a first PDSCH corresponding to first RMSI according to a first PDCCH corresponding to the first RMSI, the first RMSI being one of the target RMSI; and
    determine a position of a symbol occupied by a second PDSCH corresponding to second RMSI according to the position of the symbol occupied by the first PDSCH, the second RMSI being RMSI other than the first RMSI in the target RMSI, and the target time domain symbol comprising the symbol occupied by the first PDSCH and the symbol occupied by the second PDSCH.

* * * * *